United States Patent
Polyakov et al.

[11] Patent Number: 6,044,171
[45] Date of Patent: *Mar. 28, 2000

[54] METHOD AND APPARATUS FOR PATTERN RECOGNITION AND REPRESENTATION USING FOURIER DESCRIPTORS AND ITERATIVE TRANSFORMATION-REPARAMETRIZATION

[76] Inventors: Vladislav G. Polyakov, 1562 Dominion Ave.; Mikhail A. Ryleev, 920 Rockefeller, #10A; Boris E. Gorbatov, 930 W. Remington, #8B, all of Sunnyvale, Calif. 94087

[*] Notice: This patent issued on a continued prosecution application filed under 37 CFR 1.53(d), and is subject to the twenty year patent term provisions of 35 U.S.C. 154(a)(2).

[21] Appl. No.: 08/437,638

[22] Filed: May 9, 1995

[51] Int. Cl.[7] .................................................. G06K 9/80

[52] U.S. Cl. .......................... 382/159; 382/190; 382/224

[58] Field of Search ............................ 395/142; 382/225, 382/227, 228, 159, 161, 181, 190, 224, 276, 280; 345/442

[56] References Cited

U.S. PATENT DOCUMENTS

| | | | |
|---|---|---|---|
| 4,573,197 | 2/1986 | Crimmins | 382/22 |
| 4,975,975 | 12/1990 | Filipski | 382/227 |
| 5,075,896 | 12/1991 | Wilcox et al. | 382/225 |
| 5,335,289 | 8/1994 | Abdelazim | 382/228 |
| 5,347,595 | 9/1994 | Bokser | 382/225 |
| 5,473,742 | 12/1995 | Polyakov et al. | 395/142 |

OTHER PUBLICATIONS

Polyakov, V.G., et al., "The Electronic Line–Tracing Scanners," *Energia Publishing House, Moscow,* 1968.

Granlund, G.H., "Fourier Preprocessing for Hand Print Character Recognition," *IEEE Transactions on Computers,* vol. C–21, pp. 269–281, Feb. 1972.

Persoon, E., et al., "Shape Discrimination Using Fourier Descriptors," *IEEE Transactions on Systems, Man and Cybernetics,* vol. SMC–7, No. 3, pp. 170–179, Mar. 1977.

Arbter, K., et al., "Application of Affine–Invariant Fourier Descriptors to Recognition of 3–D Objects," *IEEE Transactions on Pattern Analysis and Machine Intelligence,* vol. 12, N. 7, pp. 640–647, Jul. 1990.

Polyakov, V.G., et al., "Choice of Parametric Representation in Numerical Approximation and Encoding of Curves," (translated from Problemy Peradachi Informatsii, vol. 20, No. 3, pp. 47–58, (Jul.–Sep. 1984).

Polyakov, V.G., et al., "Parametric Approximation, Discrete Fourier Transformation and Multicomponent Signal in the Problem of Electrocardiosignals Coding. Algorythms for Experimental Data Processing," *Nauka Publishing House,* Moscow, pp. 5–21, 1986. (English translation attached).

Polyakov, V.G., et al., "A New Coding Technique for Holter ECG Recorders: 50:1 Compression and Precise Reconstruction," *European Heart Journal,* vol. 11, Aug. 1990, XIIth Congress of the European Society of Cardiology, p. 411.

Kantorovich, L.V., et al., "Approximate Methods of Higher Analysis," *Interscience Publishers, Inc.—New York, P. Noordhoff Ltd.—Groningen—the Netherlands,* 1958, pp. 451–459, (Chapter V, #7).

Pinsker, I.Sh., Opoznavanie vektornykh funktsij I linij [Recognition of Vector–Functions and Lines] (Opoznavanie I opisanie linij [Recognition and Description of Lines], *Nauka Publishing House,* Moscow, pp. 7–29, 1972.

(List continued on next page.)

*Primary Examiner*—Andrew W. Johns

[57] ABSTRACT

A boundary curve or line pattern is recognized by using iterative parametrization and transformation to develop a Fourier descriptor set that is mutually independent and of minimal size and then applying a classification procedure to the Fourier descriptor set to obtain a recognition result. The Fourier descriptor set so obtained has properties that enable effective recognition and compression.

18 Claims, 11 Drawing Sheets

OTHER PUBLICATIONS

Shakin, V.V., Prostye algoritmy klassificatsii linij [Simple Algorythms of Line Classification] (Opoznavanie I opisanie linij) [Recognition and Description of Lines], *Nauka Publishing House*, Moscow, pp. 40–46, 1972.

Tomek, I., "Two Modifications of CNN," *IEEE Transactions on Systems, Man and Cybernetics,* vol. SMC–7, No. 11, pp. 769–772, Nov. 1976.

STARTING POINT

INITIAL DISCRETE PARAMETRIZATION OF SOURCE POLYGON SPECIFIED BY 64 EQUIDISTANT SAMPLING POINTS

INITIAL 9TH ORDER APPROXIMATE MODEL OF BOUNDARY CURVE REPRESENTED BY THE 64-VERTEXES POLYGON

9TH ORDER APPROXIMATE MODEL OF BOUNDARY CURVE OBTAINED AT 8TH ITERATION

FINAL 9TH ORDER APPROXIMATE MODEL OF BOUNDARY CURVE OBTAINED AT 20TH ITERATION. MULTIPOINT POLYGONAL REPRESENTATION BY MEANS OF 256-POINT INVERSE DFT

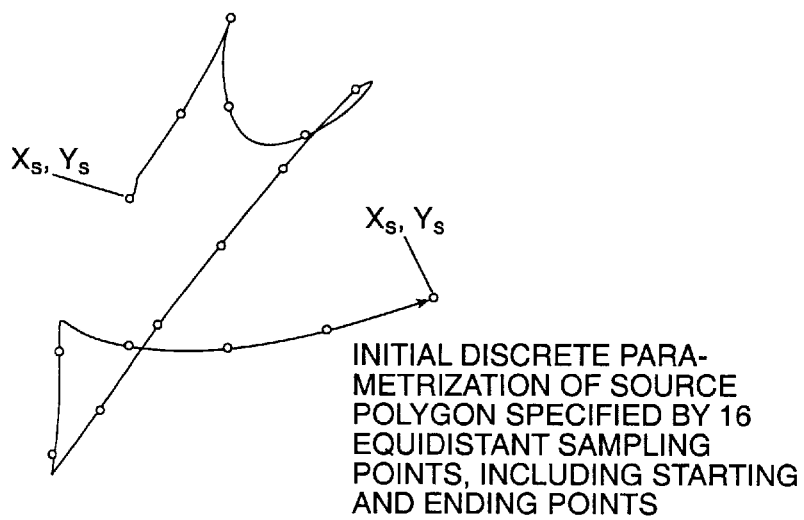
INITIAL DISCRETE PARA-
METRIZATION OF SOURCE
POLYGON SPECIFIED BY 16
EQUIDISTANT SAMPLING
POINTS, INCLUDING STARTING
AND ENDING POINTS
*FIG. 6C*
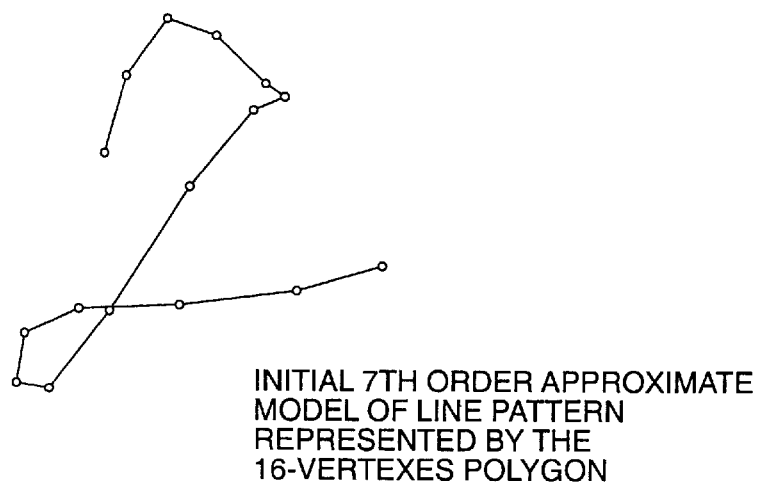
INITIAL 7TH ORDER APPROXIMATE
MODEL OF LINE PATTERN
REPRESENTED BY THE
16-VERTEXES POLYGON
*FIG. 6D*
| n | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| $L_n$ | 0 | 49 | 92 | 128 | 170 | 184 | 203 | 267 | 359 | 425 | 446 | 477 | 516 | 581 | 656 | 710 |
PARAMETRIZATION TABLE DERIVED FROM THE INITIAL
APPROXIMATE MODEL OF LINE PATTERN
*FIG. 6E*

7TH ORDER APPROXIMATE MODEL OF LINE PATTERN OBTAINED AT FIRST ITERATION

FINAL 7TH ORDER APPROXIMATE MODEL OF LINE PATTERN OBTAINED AT 10TH ITERATION, MULTIPONT POLYGONAL REPRESENTATION BY MEANS OF 128-POINT INVERSE DCT

METHOD AND APPARATUS FOR PATTERN RECOGNITION AND REPRESENTATION USING FOURIER DESCRIPTORS AND ITERATIVE TRANSFORMATION-REPARAMETRIZATION

STATEMENT OF RELATED APPLICATIONS

The present application is related to the subject matter of U.S. patent application Ser. No. 08/200,046, METHOD AND APPARATUS FOR REPRESENTING IMAGE DATA USING PIECEWISE POLYNOMIAL APPROXIMATION METHOD AND ITERATIVE TRANSFORMATION-REPARAMETRIZATION TECHNIQUE, Polyakov et al., now U.S. Pat. No. 5,473,742.

BACKGROUND OF THE INVENTION

This invention relates to pattern recognition. In particular, the invention relates to the recognition of image contours and line-drawn graphics using Fourier descriptors. Computer-aided recognition of image contours or line-drawn patterns finds application wherever it is useful to automatically interpret visual information. Representative examples include handwriting recognition, military target acquisition, automotive collision avoidance systems, and personal identification systems for security. Typically, digital information about line-drawn patterns or the boundary curves of an object is converted into a set of features that are analyzed to produce a recognition result.

A general principle known to those of skill in the recognition art is that a small representative set of mutually independent features provides the most effective recognition. Another motivation for minimizing the number of features used to describe an object to be recognized is compression for storage. This is particularly important when recognition is to be deferred as in handwriting recognition applications used in conjunction with pen-based computers and personal digital assistants (PDAs). In these systems, the written characters are stored in compressed form prior to deferred recognition.

The Fourier descriptors of contours represent one type of feature set usable for recognition. The usual process of obtaining the Fourier descriptors can be divided into two steps. First, the contours, i.e. the boundary curves, of the object are extracted and traced to develop a certain description of these boundary curves as a function of arclength. One useful example of this function is a discrete natural parametric representation of each boundary curve, i.e., the sequence of coordinates of equidistantly spaced points along the curve. This representation is then converted into a set of Fourier coefficients, e.g., by use of the Discrete Fourier Transform, to obtain the set of Fourier descriptors. Second, the set of Fourier descriptors so-derived, is processed to obtain invariance with respect to scale, translation and rotation of the object, and to position of the point used to start the tracing. The resulting processed Fourier descriptor set is then available as a feature set for further recognition processing.

Recognition techniques that take advantage of Fourier descriptors derived from the natural parametric representation of the boundary curve were described, in particular, by V. G. Polyakov et al., The Line-Tracing Scanners, "Energia" publishing house, Moscow, 1968 (in Russian) and by G. H. Granlund et al., Fourier Preprocessing for Hand Print Character Recognition, IEEE Trans. Computers, vol. C-21, pp. 269–281, 1972. The contents of these references are herein incorporated by reference.

Several recognition techniques using various types of Fourier descriptors were reviewed by E. Persoon et al., Shape Discrimination Using Fourier Descriptors, IEEE Trans. on Systems, Man, and Cybernetics, vol. SMC-7, No.3, pp. 170–179, 1977. Fourier descriptors derived from the natural parametric representation were shown by E. Persoon et al. to have some important advantages relative to ones derived from other descriptions, such as curvature or modified tangent angle taken as functions of the boundary arclength.

E. Persoon et al. further taught obtaining Fourier descriptors for "line patterns", i.e. for non-closed curves. The underlying natural parametric representation for a line pattern is obtained by tracing the line pattern forward once from one end to the other end and then retracing back to the beginning. This representation can be interpreted as an even continuation of the parametric representation obtained by the forward part of tracing. The result is a cosine-like transform achieved by application of the Discrete Fourier Transform, providing Fourier descriptors in the form of "Cosine descriptors."

Unfortunately, Fourier descriptors derived according to these prior art techniques are not mutually independent, and include a degree of redundancy. The prior art techniques require a relatively large set of Fourier descriptors to capture distinctions between objects to be recognized. This however conflicts with the previously stated principle of recognition that calls for small mutually independent feature sets. Furthermore, these large feature sets are unsuitable for intermediate storage in applications which require deferred recognition.

What is needed is an effective pattern recognition technique based on Fourier descriptors of curves and/or line patterns of an object to be recognized. The Fourier descriptors should be mutually independent and non-redundant, making them suitable for both effective recognition and compression.

SUMMARY OF THE INVENTION

In accordance with the invention, a boundary curve or line pattern is recognized by using iterative parametrization and retransformation to develop Fourier or Cosine descriptors that are mutually independent and constitute a descriptor set of minimal size and then applying a classification procedure to the so-optimized descriptor set to obtain a recognition result. The Fourier or Cosine descriptor set provided in accordance with the invention enables effective recognition and is further suitable for compression.

The recognition procedure of the present invention achieves high accuracy in multiclass shape discrimination while relying on Fourier or Cosine descriptors of limited order and reference sets of limited size. For trainable recognition systems, the resulting benefits include acceleration of the learning procedure, and reduction of the memory space needed to maintain the training library. For nearest neighbor classification systems, the resulting benefits further include reduction of memory space to maintain the reference library and reduction of the time needed for recognition.

Another important benefit is that compression is facilitated because the input curve can be accurately reconstructed from a relatively small Fourier or Cosine descriptor set. Thus, the small descriptor set generated for recognition purposes can also be readily utilized for compression purposes using methods well known in the art. As a result, certain problems arising in combined recognition-compression systems, such as eliminating differences between the results of direct recognition and deferred recognition, may also be solved by the present invention.

In accordance with a first aspect of the invention, a source polygon is obtained from a digital representation of an image representing the boundary curve or line pattern. The source polygon is initially parametrized to obtain an initial parametric representation. The initial parametric representation is then transformed into the frequency domain to obtain an initial Fourier or Cosine representation. Higher order coefficients of the Fourier or Cosine representation are attenuated in accordance with a predetermined order of approximation. Inverse transformation of the resulting attenuated Fourier or Cosine representation provides an approximation of the source polygon. A parametrization of the so-approximated source polygon is then obtained. This parametrization is normalized and applied to the original source polygon to obtain a successor parametric representation which is converted to the frequency domain to obtain a successor Fourier or Cosine descriptor representation which is also subject to attenuation. The cycle of iterative parametrization and transformation continues until the approximation of the source polygon meets a predetermined goodness-of-fit or convergence criterion. The final attenuated Fourier set representation is then truncated in accordance with a predetermined order of approximation and serves as the descriptor set for recognition.

In accordance with a second aspect of the invention, a Fourier or Cosine descriptor set obtained by iterative reparametrization and transformation identifies a location in a descriptor space that is divided into decision regions. A class label of the decision region including the obtained Fourier or Cosine descriptor set is converted to the recognition result.

In the preferred embodiment, the decision region is determined by selecting a reference descriptor set nearest to the obtained descriptor set from a library of class-labeled reference descriptor sets stored in an electronic memory device. The class label of the decision region is then determined to be a class label associated with the nearest reference descriptor set.

In accordance with a third aspect of the invention, a library of reference descriptor set for use in pattern recognition is assembled. For each reference pattern, a digital representation and class label of the reference pattern are captured. The digital representation of each reference pattern is converted using iterative parametrization and transformation, into the reference descriptor set. The reference descriptor sets and class labels are stored together as entries in the library.

One embodiment of the invention provides a technique for enhancing the library of reference descriptor sets. A digital representation of a new reference pattern is captured along with its known associated class label. The new reference pattern is converted using iterative parametrization and transformation into a new reference descriptor set. A previously stored reference descriptor set nearest to the new reference descriptor set in descriptor space is then identified. If the class label of this nearest reference descriptor set matches the class label of the new reference pattern, a first distance between the nearest reference descriptor set and new reference descriptor set is compared to a second distance between the new reference descriptor set and a nearest reference descriptor set that does not have the class label of the new reference descriptor. If the ratio of the first distance to the second distance exceeds a predetermined threshold, the new descriptor set and class label of the new reference pattern are added to the library as reinforcement.

The recognition technique of the invention is related to certain developments in approximation theory. A theoretical discussion of a method for finding a serviceable pair of trigonometric polynomials for describing curves using an iterative transformation-reparametrization process can be found in V. G. Polyakov et al., "Choice of Parametric Representation in Numerical Approximation and Encoding of Curves" (Translated from 20: 3 Problemy Peredachi Informatsii, 47–58, July–September, 1984). It has further been shown that the approximation method disclosed therein can be applied to the compression of multidimensional closed curves which represent an appropriately segmented multicomponent electrocardiosignal, V. G. Polyakov et al., Parametric Approximation, Discrete Fourier Transformation and Multicomponent Signal in the Problem of Electrocardiosignals Coding, Algorithms for Experimental Data Processing (Moscow, Nauka), pp. 5–21, 1986.

Further extensions of these transformation-reparametrization techniques as they relate to compression are disclosed in U.S. patent application Ser. No. 08/200,046, METHOD AND APPARATUS FOR REPRESENTING IMAGE DATA USING PIECEWISE POLYNOMIAL APPROXIMATION METHOD AND ITERATIVE TRANSFORMATION-REPARAMETRIZATION TECHNIQUE. The contents of this application are herein incorporated by reference. One aspect of the present invention concerns the application of similar transformation-reparametrization techniques to recognition.

The invention will be better understood upon reference to the following detailed description in connection with the accompanying drawings.

BRIEF DESCRIPTION OF THE DRAWINGS

FIG. 6C shows the source polygon of FIG. 6B specified by equidistant sampling points as a result of initial discrete parametrization in accordance with the present invention.

FIG. 6D shows an approximate model of the line pattern of FIG. 6A as represented in an initial set of cosine descriptors derived in accordance with the present invention.

FIG. 6E shows a parametrization table derived from the initial approximate model of FIG. 6D.

DESCRIPTION OF SPECIFIC EMBODIMENTS

Figure 1A:
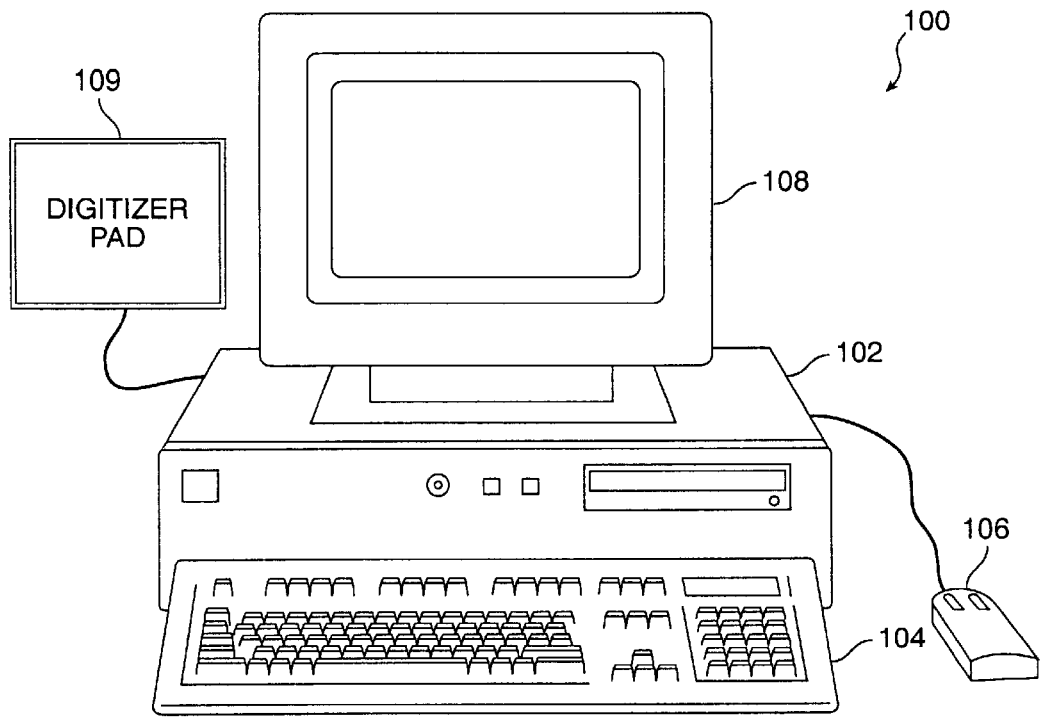
FIG. 1A is a block diagram of an exemplary hardware configuration for a computer system in which the present invention may be implemented.

FIG. 1A shows a preferred computer system 100 in which the present invention may be implemented. A processing unit 102 contains the control elements of the computer system 100. A keyboard 104 and a mouse 106 are coupled to a processing unit 102 and enable the system user to input commands and data to a computer system 100. A display device 108 serves as another element of the user interface. A digitizer pad 109 allows for handwritten input.

Figure 1B:
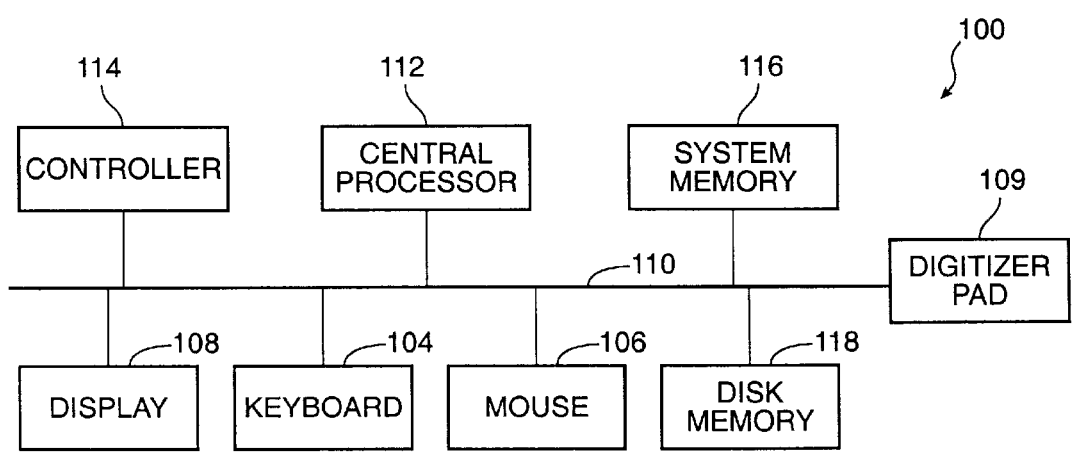
FIG. 1B is a system architecture block diagram of the computer system of FIG. 1A.

FIG. 1B shows a system architecture block diagram of the computer system of FIG. 1A. The system elements are interconnected by system bus 110. In addition to keyboard 104, mouse 106, display 108, and digitizer pad 109, the control elements included in processing unit 102 are shown. Central processor (CPU) 112 and controller 114 control operation of computer system 100. Program and data information are stored in system memory 116 and disk memory 118. A pattern recognition program in accordance with the invention is operably disposed in system memory 116 and disk memory 118. Of course, the system of FIGS. 1A–1B is merely representative of hardware usable to implement the invention.

Figure 2:
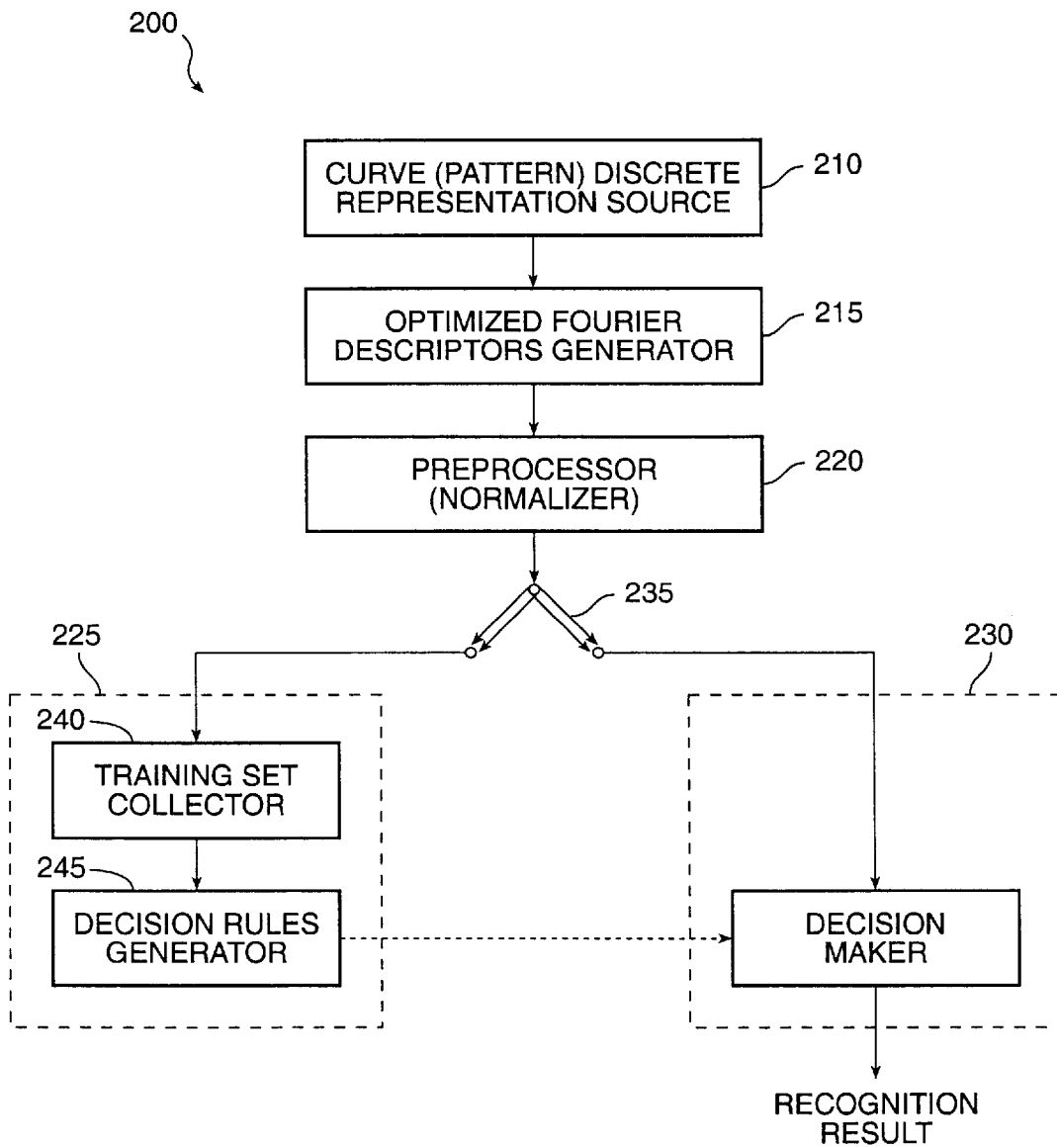
FIG. 2 is a simplified block diagram showing an improved recognition system using Fourier descriptors of boundary curves or line patterns according to the present invention.

FIG. 2 is a top-level block diagram showing an improved recognition system 200 using Fourier descriptors of boundary curves or Cosine descriptors of line patterns according to the present invention. A parametrizer 210 obtains source-discrete parametric representations of contours, boundary curves or line patterns using methods well known in the art. An Optimized Fourier Descriptor (OFD) generator 215 converts source-discrete parametric representations into minimized sets of mutually independent coefficients of a suitable orthogonal transform, such as the Discrete Fourier Transform (DFT) or Discrete Cosine Transform (DCT). OFD generator 215 makes use of the iterative transformation-reparametrization technique of the invention. A preprocessor 220 preprocesses the resulting set of coefficients (OFD coefficients) in order to achieve invariance with respect to similarity transformations such as scaling and rotation.

A switch 235 then directs the preprocessed OFD coefficients as a set to either a training processor 225 or to a decision processor 230. Training processor 225 includes a memory 240 for storing a training library of OFDs and a decision rules generator 245. Decision processor 230 performs recognition operations using the decision rules generated by training processor 225. The functionality of recognition system 200 may be divided between hardware and software in any way. The detailed operation of recognition system 200 will be described in reference to FIGS. 3–7 as follows.

Figure 3:
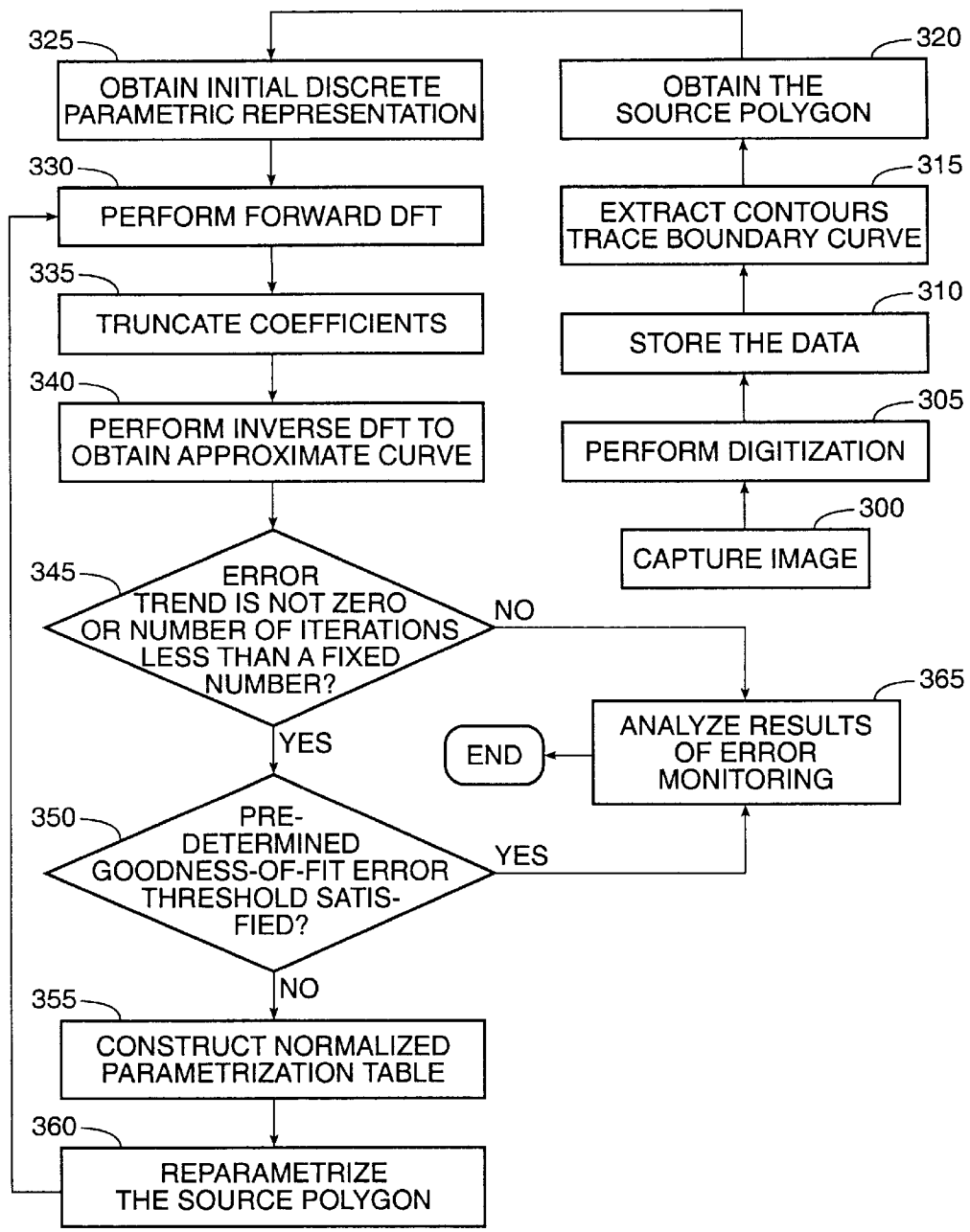
FIG. 3 is a flowchart describing steps of generating the optimized set of Fourier descriptors for boundary curves according to one aspect of the present invention.
Figure 4A:
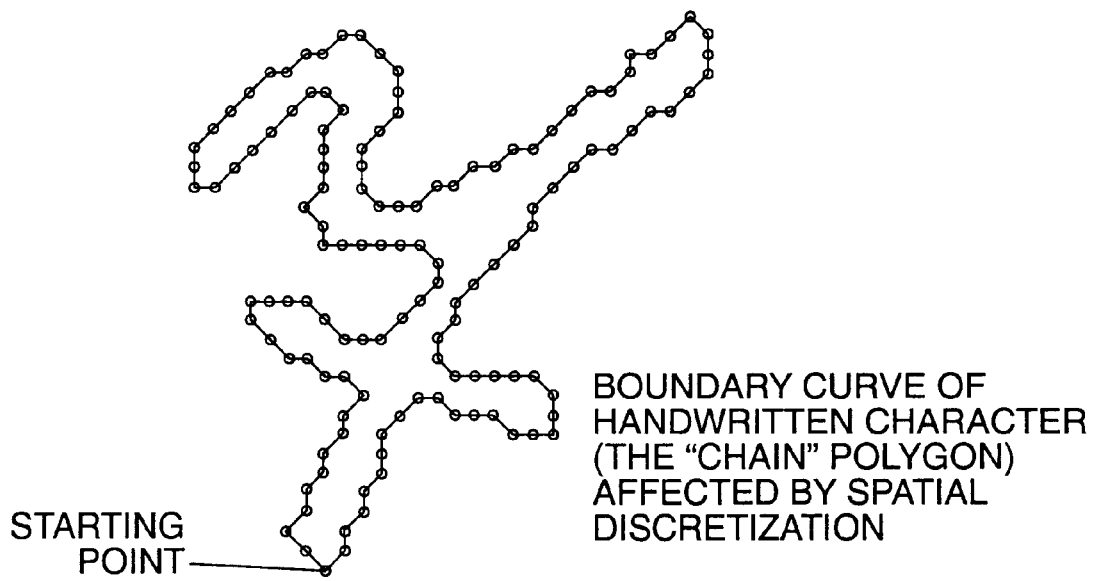
FIG. 4A shows an initial boundary curve extracted and traced as a chain of pixels.

FIG. 3 is a flowchart describing steps of generating the optimized set of Fourier descriptors for boundary curves according to one embodiment of the present invention. At step 300, an image including a boundary curve to be recognized is captured. At step 305, the image is digitized. At step 310, the digitized image is stored. The boundary curve is traced at step 315 as a closed chain of boundary pixels using methods well known in the art. The centers of pixels in that chain are treated as vertices of a polygon representing the boundary curve. The polygon so constructed is designated the "chain" polygon. FIG. 4A depicts an example of such a chain polygon.

Figure 4B:
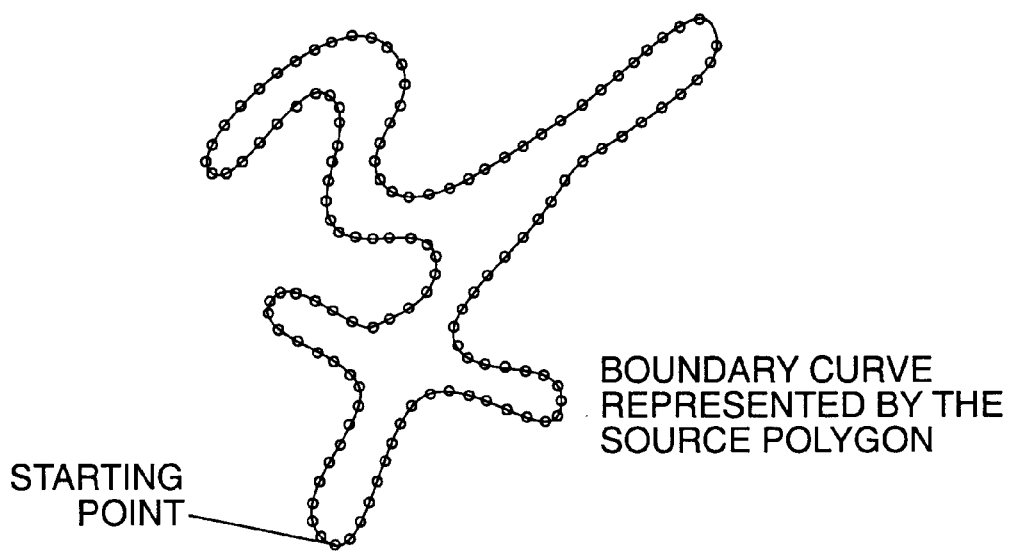
FIG. 4B shows the preprocessed boundary curve represented as a source polygon in accordance with the present invention.

Due to the effects of spatial discretization, the chain polygon obtained at step 315 does not provide an adequate representation of the boundary curve arclength. In the preferred embodiment, in order to correct arclength-related distortions to facilitate later iterative transformation-reparametrization operations, a smoothed version of the chain polygon is produced at step 320 using a well-known smoothing transformation such as a low-pass filter. For example, a 5th-order finite impulse response (FIR) filter can be used, to obtain vertices $\{x_m, y_m\}$ of a smoothed polygon as $$x_m = c_1 \hat{x}_{m-2} + c_2 \hat{x}_{m-1} + c_3 \hat{x}_m + c_4 \hat{x}_{m+1} + c_5 \hat{x}_{m+2}, \quad (1)$$

$$y_m = c_1 \hat{y}_{-2} + c_2 \hat{y}_{m-1} + c_3 \hat{y}_m + c_4 \hat{y}_{m+1} + c_5 \hat{y}_{m+2},$$

$$m = 0, \ldots, M-1,$$

where $x_m$, $y_m$ are coordinates of the m-th vertex of chain polygon, $C_1 = 1/16$, $C_2 = 4/16$, $C_3 = 6/16$, $C_4 = 4/16$, $C_5 = 1/16$ are filter window coefficients, and M is the total number of vertices in the chain polygon. The smoothed version of the chain polygon is then designated to be the source polygon. FIG. 4B shows the source polygon corresponding to the boundary curve of FIG. 4A.

Figure 4C:
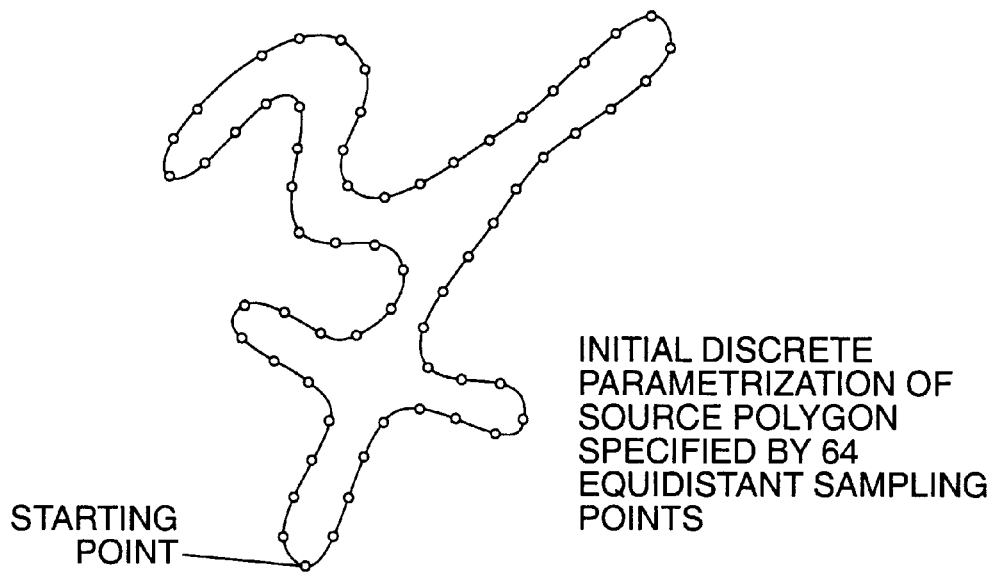
FIG. 4C shows the source polygon of FIG. 4B specified by equidistant sampling points as a result of initial discrete parametrization in accordance with the present invention.

The steps that follow form a part of the operation of OFD generator 215 according to the iterative transformation-reparametrization technique of the invention. The transformation-reparametrization technique is along the lines discussed in reference to FIG. 2 of U.S. patent application Ser. No. 08/200,046. First, an initial parametrization of the source polygon is performed at step 325. The initial parametrization procedure consists of constructing an arbitrary discrete parametric representation whose size is determined by the chosen size of the ultimate DFT. The arbitrary representation so constructed is designated the initial parametric representation. For example, arc length can be used as a parameter in the initial parametric representation. As a further example, if the size of the DFT is chosen to be 64, 64 equidistant sampling points can be located along the source polygon, as it is shown at FIG. 4C, to form the initial parametric representation.

From the above it is clear that the parametrized source polygon is now represented by a pair of coordinate sequences $$\{x_n\}, \{y_n\}; n=0, \ldots, N-1 \quad (2)$$

where $x_n$, $y_n$ are the coordinates of the n-th sampling point;
$x_0 = x_s$, $y_0 = y_s$ are the coordinates of the source polygon vertex chosen as a starting point; and N is the chosen size of the DFT to be used in the iterative transformation-reparametrization procedure.

Thereafter, the forward DFT is applied to coordinate sequences (2) at step 330, and the set of Fourier coefficients obtained by the forward DFT is attenuated according to the chosen order of approximation at step 335.

As an example of attenuation, if the real DFT is applied separately to each of the sequences (2), and the chosen order of approximation is P, then each coefficient whose number is greater than P can be attenuated to half of its actual value.

As another example, the coefficients to be attenuated can simply be set to zero, that is, the set of Fourier coefficients can be truncated to the order P. In case of truncation the steps 330 and 335 result in the set of Fourier coefficients $\{A_k, B_k, C_k, D_k\}$:

$$A_0 = (1/N) \sum_n (x_n),$$
$$B_0 = 0,$$
$$A_k = (2/N) \sum_n (x_n \cos(k t_n)),$$
$$B_k = (2/N) \sum_n (x_n \sin(k t_n)),$$
$$C_0 = (1/N) \sum_n (y_n),$$
$$D_0 = 0,$$
$$C_k = (2/N) \sum_n (y_n \cos(k t_n)),$$
$$D_k = (2/N) \sum_n (y_n \sin(k t_n)),$$
$$t_n = 2\pi n / N,$$
$$n = 0, \ldots, N - 1,$$
$$k = 0, \ldots, P - 1.$$

(3)

The attenuated set of Fourier coefficients is thereafter used at step 340 to obtain via an inverse N-point DFT an approximation of the boundary curve as specified by the approximation's N-point discrete parametric representation $\{x_n, y_n\}$:

$$x_n = \sum_k (A_k \cos(k t_n) + B_k \sin(k t_n)),$$
$$y_n = \sum_k (C_k \cos(k t_n) + D_k \sin(k t_n)),$$
$$t_n = 2\pi n / N,$$
$$n = 0, \ldots, N - 1,$$
$$k = 0, \ldots, P - 1.$$

(4)

The remainder of the discussion will assume that truncation is used as the mode of attenuation.

The source polygon and the approximate boundary curve are different from one another due to approximation error. The number of repetitions is controlled by monitoring the approximation error. One possible measure of approximation error is the mean square error between the N-point representation of the reparametrized source polygon (2) and the corresponding approximate curve (4). This measure can be used as long as it corresponds well with a subjective visual goodness-of-fit evaluation of boundary curves for handwritten characters and other objects upon reconstruction.

At the first stage of error monitoring, step 345, the trend of approximation error for several recent iterations is evaluated. If the approximation error trend is not nearly flat for, e.g., the four most recent iterations, i.e. the process has not converged, or if the number of iterations is less than four (conditional transition YES at step 345), then the level of approximation error is checked against a predetermined goodness-of-fit threshold at the second stage of error monitoring, step 350. If the achieved approximation error is worse than the predetermined goodness-of-fit threshold (conditional transition NO at step 350), the transformation reparametrization cycle continues, and the parametrization table is derived from the approximate boundary curve at step 355 to prepare for reparametrization of the source polygon.

Figure 4D:
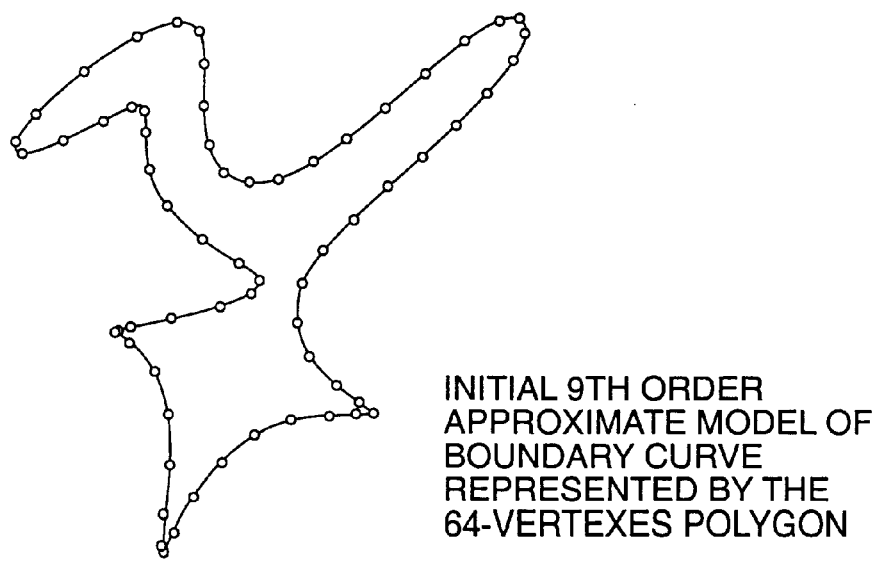
FIG. 4D shows an approximate model of the boundary curve as represented by an initially derived set of Fourier descriptors obtained in accordance with the present invention.

One simple way to define the approximate curve from its discrete parametric representation (3) is to treat the N points specified by (3) as vertices of a polygon. The polygon so constructed is designated the current approximation of the boundary curve. FIG. 4D shows the initial current approximation of the boundary curve of FIG. 4A. To prepare the parametrization table at step 355, the distance from each vertex to the starting vertex along the current approximation of the boundary curve is computed. The parametrization table contains a sequence of these distances. The first distance in the table corresponds to the starting vertex and, consequently, is zero, and the last distance is the total length of the current approximation of the boundary curve. The parametrization table is then normalized by multiplying each distance in the table with a length-normalizing factor $\lambda_k$ where k represents the number of iterations performed thus far. For example, $$\lambda_{k=\lambda 1}$$

in this first iteration. The length-normalization factor $\lambda_k$ represents the ratio of the total length of the source polygon to the total length of the current approximation of the boundary curve.

Figure 4E:
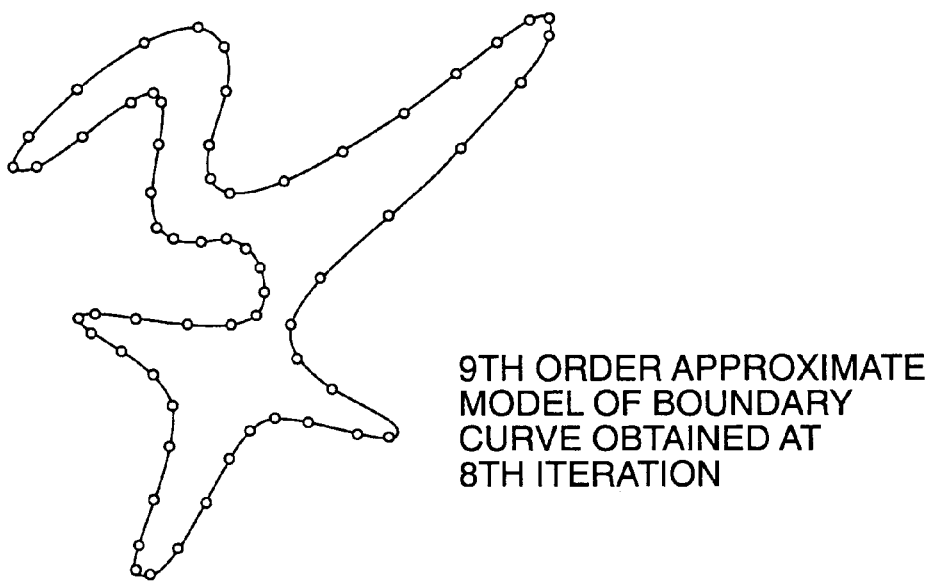
FIG. 4E shows a refined approximate model of boundary curve of FIG. 4A as represented by a set of Fourier descriptors iteratively updated in accordance with the present invention.

The original source polygon is than reparametrized at step 360. The new sampling points are located along the source polygon in accordance with the distances to the starting point specified by the normalized parametrization table. The reparametrized source polygon determined by updated representation (2) is than again approximated at steps 330, 335 and 340 to refine the approximation of the boundary curve. Because the new N-point representation of the source polygon is transformed at step 330 as a sequence of parametrically equidistant points, the effect of reparametrization is achieved. The resulting second approximation of the boundary curve determined by a new set (3) of Fourier descriptors updated at step 335 and by a new representation (4) updated at step 340 is then further refined by performing the third iteration, and so on. The current 9th-order approximate model of the boundary curve obtained after the 8th iteration is shown in FIG. 4E.

The transformation-reparametrization procedure is repeated in the manner described above until either the process is converged (condition NO at step 340) or the predetermined goodness-of-fit threshold is satisfied (condition YES at step 345). Execution then proceeds to step 365 where it is decided whether the process should be stopped or should continue under renewed conditions. The process can be stopped, for example, if it has converged and a goodness-of-fit threshold is satisfied. The process, also for example, can be continued using an increased approximation order for further refinement, if the process is converged, but the goodness-of-fit threshold is not satisfied. Eventually, the process is stopped, and the truncated set of Fourier coefficients, that is the set of OFD coefficients, formed and stored up to this point at step 335, is transferred to the training or decision processors 225 and 230 of the recognition system.

Figure 4F:
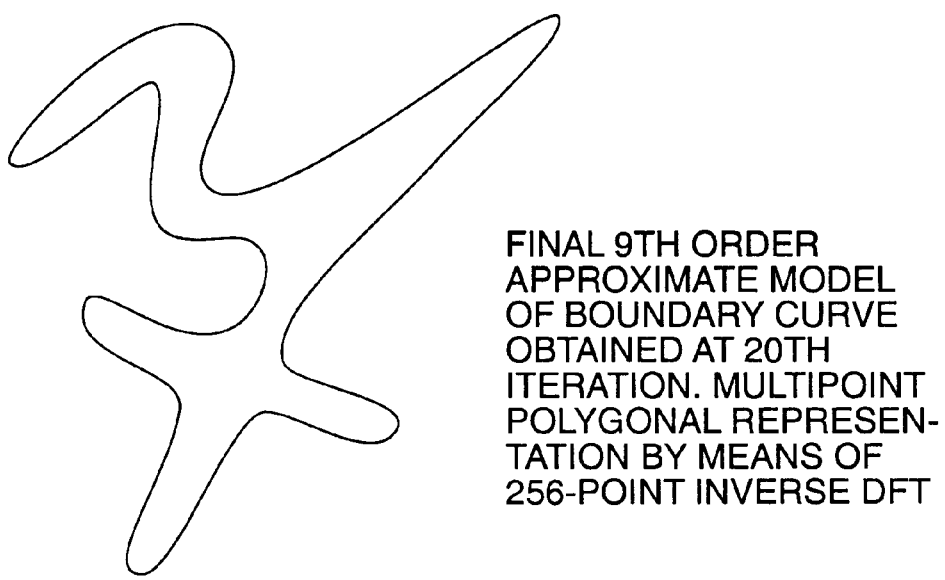
FIG. 4F shows a resulting approximate model of the boundary curve of FIG. 4A produced by a final set of Fourier descriptors obtained in accordance with the present invention.

FIG. 4F shows a resulting approximate model of the boundary curve of FIG. 4A produced by a final set of Fourier descriptors obtained in accordance with the present invention. To construct the multivertex representation shown in FIG. 4F, the final set of Fourier descriptors is padded by zeros up to the size suitable for a large multipoint inverse DFT. Here, a 256 point DFT was used.

The initial 9th-order approximate model of the boundary curve shown in FIG. 4D, and the corresponding initial Fourier descriptor set derived from the natural parametric representation of the boundary curve, are substantially similar to what is achievable with the prior art technique of generating the Fourier descriptor set using a single parametrization. A comparison of FIGS. 4D and 4F clearly shows the superiority of the curve approximation technique of the present invention in constructing approximations suitable for both high sensitivity shape analysis and high quality shape reconstruction.

Figure 5:
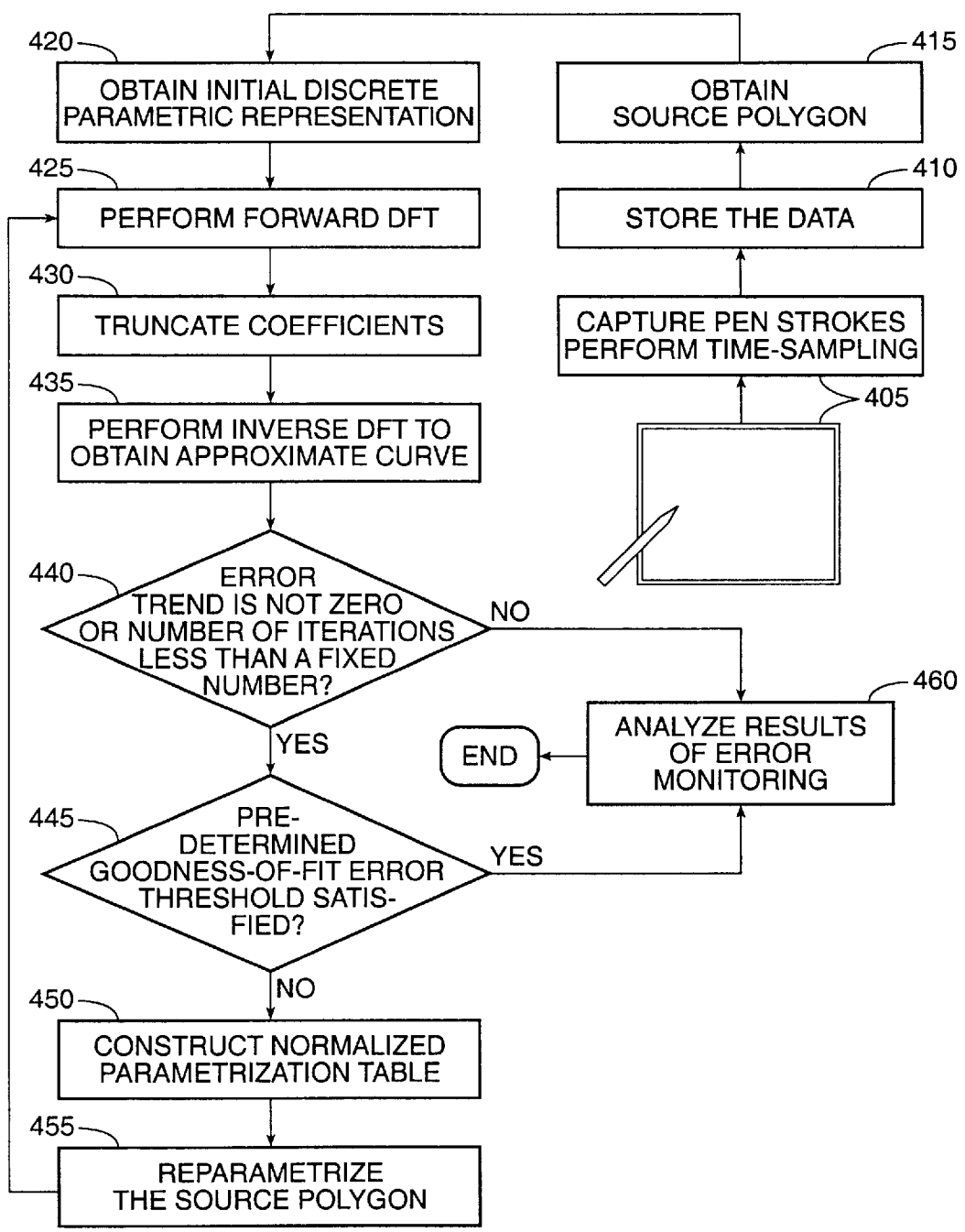
FIG. 5 is a flowchart describing steps of generating an optimized set of Cosine descriptors for line patterns according to one aspect of the present invention.

FIG. 5 is a flowchart describing steps of generating an optimized set of Fourier descriptors (Cosine Descriptors) for line patterns according to one aspect of the present invention. The Optimized Cosine Descriptor (OCD) generation procedure of the invention can be used for both recognition and compression of line patterns, i.e. non-closed curves. It will be seen that this method is quite similar to the method for generating OFDs described in reference to FIG. 3. A key distinction is the use of the Discrete Cosine Transform in iterative parametrization-transformation to derive optimized descriptors for line patterns.

Figure 6A:
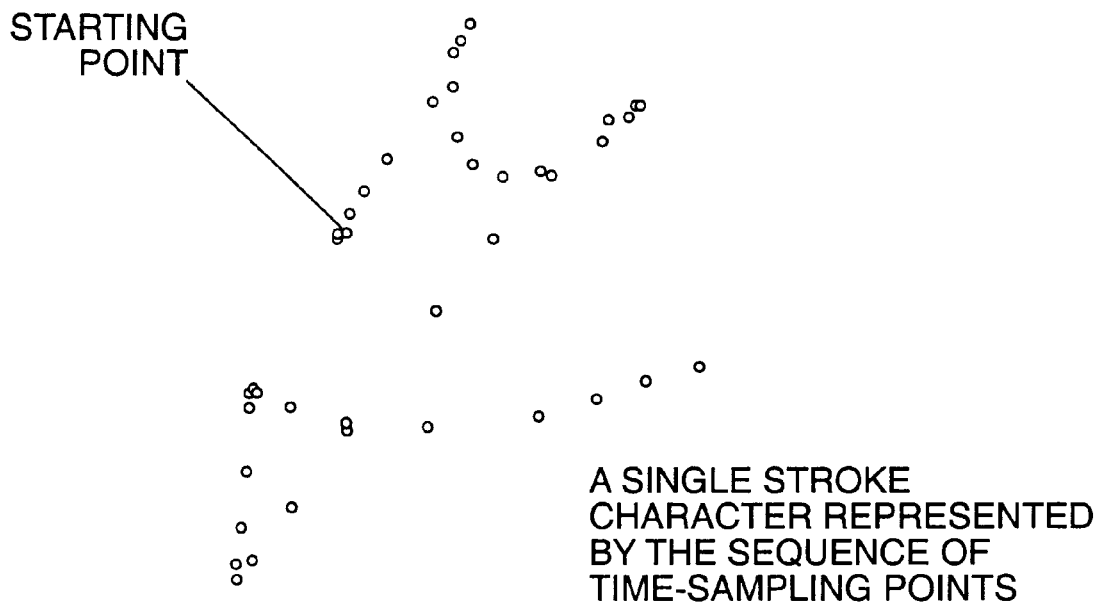
FIG. 6A shows a line pattern represented by a sequence of time-sampled points.

A source line pattern such as handwritten character is first time-sampled using a pen-tablet or other device well known in the art at step 405. The sequence of sampling points, such as that shown in FIG. 6A, is then stored in a memory or buffer at step 410. Each sampling point in the sequence is specified by a pair of rectangular coordinates (x, y). In order to define the curve from the sequence of time-sampling points these points can be treated as vertices of a polygon. The polygon so constructed is designated the source polygon at step 415. An example of such a source polygon is shown in FIG. 6B.

Figure 6B:
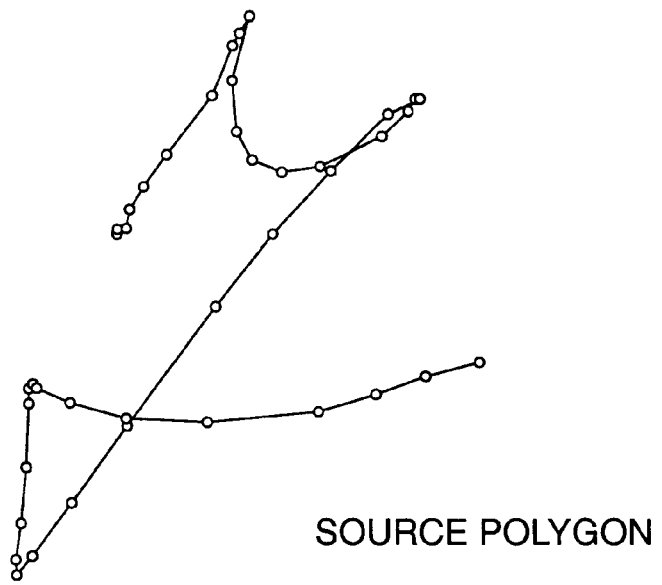
FIG. 6B shows the line pattern of FIG. 6A represented by a source polygon in accordance with the present invention.

FIGS. 6A and 6B illustrate the case of a character written by a single pen stroke. An example of operations to be performed at step 415 in the case of a character composed by several pen strokes will be described below.

Thereafter, a sequence of the source polygon vertices, specified by the corresponding sequence of coordinate pairs, is fed into the OCD Generator utilizing the iterative transformation-reparametrization technique. In order to deal with a line pattern, i.e. a non-closed curve represented by a source polygon, the OCD Generator employs the DCT at the transformation stage.

First, an initial parametrization of the source polygon is performed at step 425. The initial parametrization procedure consists of constructing an arbitrary discrete parametric representation whose size is determined by the chosen size of the ultimate DCT. The arbitrary representation so constructed is designated the initial parametric representation. For example, arc length can be used as a parameter in the initial parametric representation. As a further example, if the size of the DCT is chosen to be 16, 16 equidistant sampling points can be located along the source polygon, as is shown at FIG. 6C, to form the initial parametric representation.

From the above it is clear that the parametrized source polygon is now represented by a pair of coordinate sequences $$\{x_n\}, \{y_n\}; n=0, \ldots, N-1, \quad (5)$$

where:

$x_n$, $y_n$ are the coordinates of the n-th sampling point;

$x_0 = x_s$, $y_0 = y_s$ are the coordinates of starting vertex of the source polygon;

$x_{N-1} = x_e$, $y_{N-1} = y_e$ are the coordinates of ending vertex of the source polygon;

N is the chosen size of the DCT to be used in iterative transformation-reparametrization procedure.

Thereafter, the forward DCT is applied to coordinate sequences (5) at step 425, and the set of cosine coefficients obtained by the forward DCT is attenuated according to the chosen order of approximation at step 430. For example, if attenuation is performed by truncation, and the chosen degree of approximation is P, then Steps 425 and 430 result in the set of cosine coefficients $\{F_k, G_k\}$:

$$F_0 = (1/N) \sum_n (x_n), \quad (6)$$

$$F_k = (2/N) \sum_n (x_n \cos(kt_n)),$$

$$G_0 = (1/N) \sum_n (y_n),$$

$$G_k = (2/N) \sum_n (y_n \cos(kt_n)),$$

$$t_n = \pi(n + 1/2)/N,$$

$$n = 0, \ldots, N-1,$$

$$k = 0, \ldots, P-1.$$

The truncated set of cosine coefficients is thereafter used at Step 435 to obtain, via the inverse N-point DCT, the approximate line pattern specified by its N-point discrete parametric representation $\{\tilde{x}_n, \tilde{y}_n\}$:

$$\tilde{x}_n = \sum_k (F_k \cos(kt_n)), \quad (7)$$

$$\tilde{y}_n = \sum_k (G_k \cos(kt_n)),$$

$$t_n = \pi(n + 1/2)/N,$$

$$n = 0, \ldots, N-1,$$

$$k = 0, \ldots, P-1.$$

The source polygon and the approximate line pattern are different from one another due to approximation error. The number of repetitions is controlled by monitoring the approximation error. One possible measure of approximation error is the mean square error between the N-point representations of the reparametrized source polygon (5) and the corresponding approximate curve (7). This measure can be used as long as it corresponds with a subjective visual goodness-of-fit evaluation of line patterns for handwritten characters and other objects upon reconstruction.

At the first stage of error monitoring, step 440, the trend of approximation error for several recent iterations is evaluated. If the approximation error trend is not nearly flat for, e.g., the four most recent iterations, i.e. the process has not converged, or if the number of iterations is less than four (conditional transition YES at step 440), then the level of approximation error is checked against a predetermined goodness-of-fit threshold at the second stage of error monitoring, step 445. If the achieved approximation error is worse than the predetermined goodness-of-fit threshold (conditional transition NO at step 445), the transformation reparametrization cycle continues, and the parametrization table is derived from the approximate line pattern at step 450 to prepare for reparametrization of the source polygon.

To define the approximate curve from its discrete parametric representation (7), the points specified by (7) can be treated as N vertices of a polygon. The polygon so constructed is designated the current approximation of the boundary curve. FIG. 6D shows the initial current approximation of the line pattern of FIG. 6A.

To prepare the parametrization table at step 450, the distance from each vertex to the starting vertex along the current approximation of the line pattern is computed. The parametrization table contains a sequence of these distances. The first distance in the table corresponds to the starting vertex and, consequently, is zero, and the last distance is the total length of the current approximation of the line pattern. The parametrization table is then normalized by multiplying each distance in the table with a length-normalizing factor $\lambda_k$ where k represents the number of iterations performed thus far. For example, $\lambda_k = \lambda_1$ in the first iteration. The length-normalization factor, $\lambda_k$, represents the ratio of the total length of the source polygon to the total length of the current approximation of the line pattern.

Figure 6F:
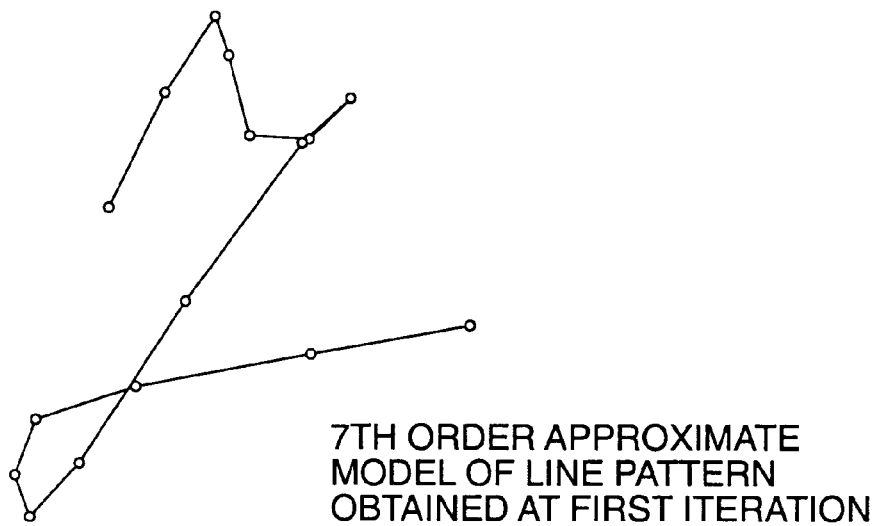
FIG. 6F shows a refined approximate model of the line pattern of FIG. 6A as represented by a set of cosine descriptors iteratively updated in accordance with the present invention.

The original source polygon is than reparametrized at step 455. The new sampling points are located along the source polygon in accordance with the distances to the starting point specified by the normalized parametrization table. The reparametrized source polygon determined by updated representation (5) is than again approximated at steps 425, 430, and 435 to refine the approximation of the line pattern. The resulting "first iteration" 7th-order approximation of the line pattern determined by the new set of cosine coefficients (6) updated at step 430 and by the new representation (7) updated at step 435 is shown in FIG. 6F.

Figure 6G:
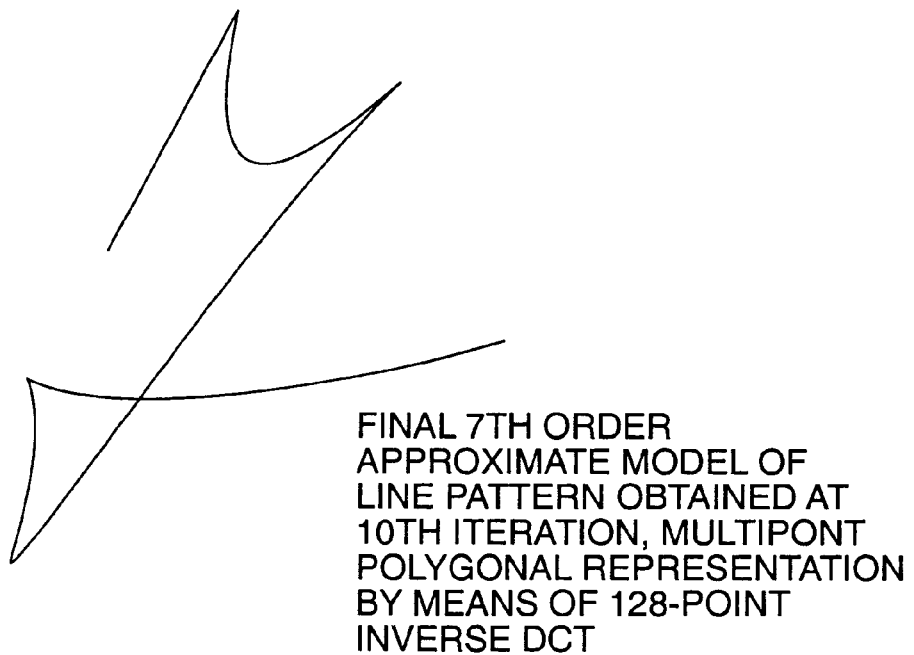
FIG. 6G shows a resulting approximate model of the line pattern of FIG. 6A as represented by a final set of cosine descriptors obtained in accordance with the present invention.

The transformation-reparametrization procedure is repeated in the manner described above until either the process is converged (condition NO at step 440) or the predetermined goodness-of-fit threshold is satisfied (condition YES at step 445). Execution then proceeds to step 455 where it is decided whether the process should be stopped or should continue under renewed conditions. The process can be stopped, for example, if it has converged and goodness-of-fit threshold is satisfied. The process can also be continued using an increased approximation order for further refinement, if the process has converged, but the goodness-of-fit threshold is not satisfied. Eventually, the process is stopped, and the truncated set of cosine coefficients, that is the set of OCD coefficients, formed and stored up to this point at step 425, is transferred to the training or decision processors 225 and 230 of recognition system 200. FIG. 6G shows a resulting approximate model of the line pattern of FIG. 6A as represented by a final set of cosine descriptors obtained in accordance with the present invention.

As can be seen from FIG. 6B, the initial 7th order approximation of the handwritten numeral "7", corresponding to the initial cosine descriptor set derived from the natural parametric representation of the line pattern of FIG. 6A, is not readily recognizable as a "7". In fact, the approximation could be interpreted as a handwritten "2". On the other hand, the final OCD set is suitable both for high-sensitivity pattern analysis and high-quality pattern reconstruction as evidenced by the clear reproduction of a "7" shown in FIG. 4G.

Any recognition method suitable for using Fourier descriptors can take advantage of the OFD or OCD sets generated and utilized according to the present invention. As an example, one specific embodiment of the improved recognition system shown in FIG. 2 is described below using a nearest neighbor method of shape or pattern discrimination.

Figure 7:
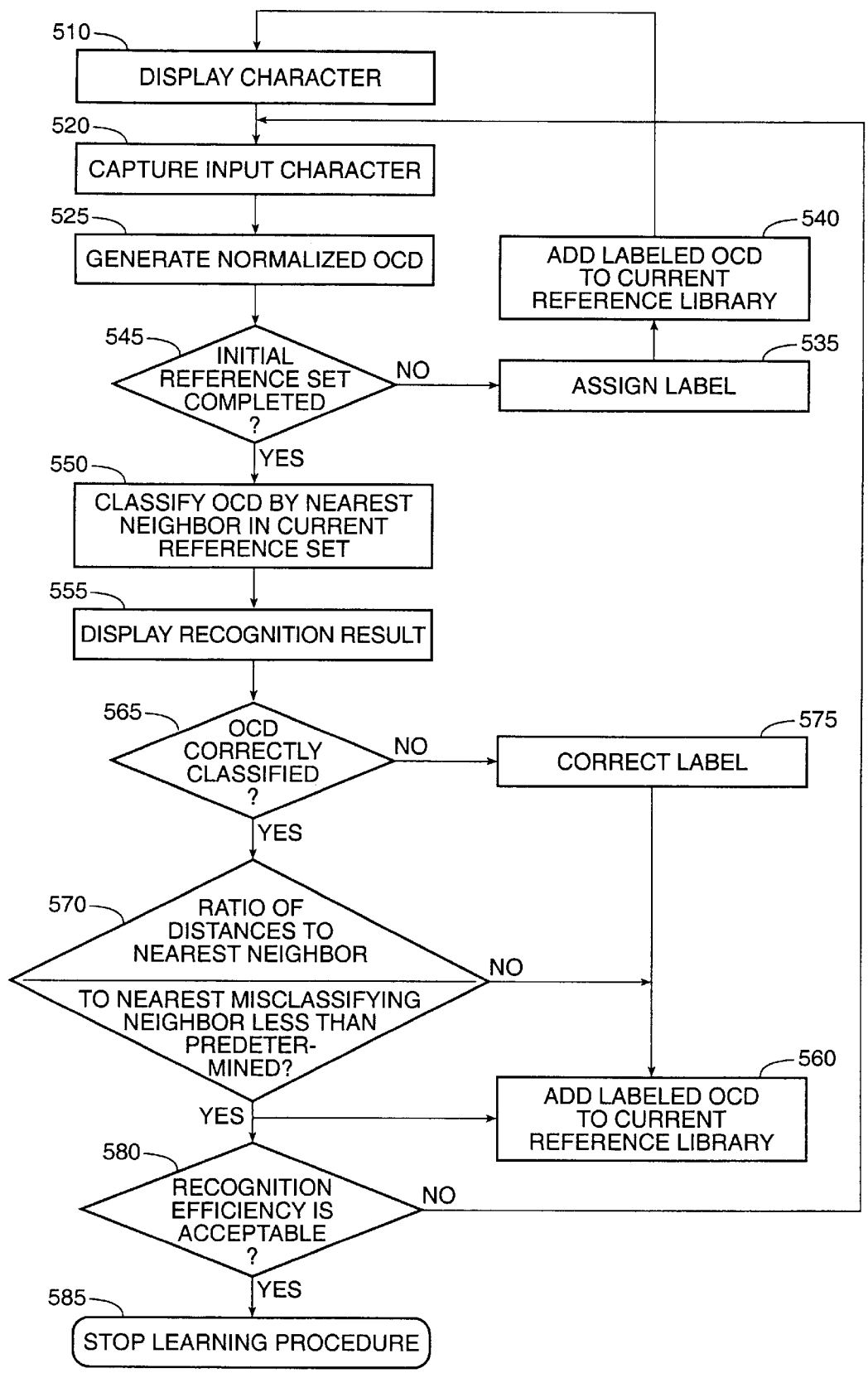
FIG. 7 is a flowchart describing steps of developing a library of reference descriptor sets for use in the recognition procedure of the present invention.

FIG. 7 is a flowchart describing steps of developing a library of reference descriptor sets in accordance with the invention for use in recognition. The learning procedure depicted in FIG. 7 can be understood as including two phases. In the first phase, the user is prompted to enter handwritten characters, the handwritten characters are individually converted into OCD representations, and the OCD representations are labeled according to which characters the user was prompted to enter. This procedure is repeated to develop an initial personalized reference library of labeled OCD vectors.

In the second phase, the user may enter either arbitrary text or displayed text. The characters entered by the user are converted to OCD vectors and recognized using the initial reference library of OCD vectors by determining the nearest labeled OCD vector in recognition space to the OCD vector corresponding to the entered character. For each character, the label is converted to the recognition result. The user verifies if the recognition result corresponds to the character that was actually entered. (The recognition procedure of the preferred embodiment is described below.)

If the recognition result is incorrect, the correctly labeled OCD vector is added to the reference set. If the recognition result is correct, a first distance between the OCD vector corresponding to the input character and the nearest OCD vector in the reference library is compared to a second distance between the OCD vector corresponding to the input character and the nearest OCD vector in the reference library having a different class label. If a ratio of the first distance to the second distance is greater than a predetermined threshold, the labeled OCD vector corresponding to the input character is added to the reference set.

At step 510, a character is displayed to the user. In the preferred embodiment, characters are actually displayed one word at a time. The user responds by writing the displayed character by hand. The handwritten character is captured at step 520, for example, by a pen-tablet in accordance with steps 405, 410, and 415 of FIG. 5, and then converted at step 525 in accordance with the OCD generation procedure discussed in connection with FIG. 5. Of course, in the second phase, prompting characters need not be displayed and the user may enter arbitrary text.

At step 545, it is determined whether the learning procedure is currently in the first or second phase. When the procedure is in the first phase, execution proceeds to step 535, where the correct class label is assigned to the OCD vector derived from the input character. The assigned class label corresponds to the character that was displayed for user input. Then at step 540, the class-labeled OCD vector is added to the reference library. At step 510, processing of a new character begins.

The first phase continues until a predetermined list of words has been exhausted. Once the list is exhausted, the procedure begins to follow the conditional branch from step 545 to step 550. At step 550, the procedure classifies the OCD vector corresponding to the input character by identifying its nearest neighbor in the reference library as measured in descriptor space and then identifying the class label of this nearest neighbor. At step 565, the procedure converts this class label to a recognition result and determines whether it is correct, possibly by querying the user.

If this class label is not correct, execution proceeds to step 575 where the correct class label is assigned to the OCD vector corresponding to the input character. Then at step 560, the correctly labeled OCD vector is added to the reference step.

If, on the other hand, the class label is correct, the procedure then determines at step 570 whether the OCD vector derived from the input character is nonetheless needed as a reinforcement pattern. This is done by calculating the ratio r where $$r = \frac{\text{Distance from correctly classified descriptor set to its nearest neighbor}}{\text{Distance from the correctly classified descriptor set to its nearest misclassifying neighbor}}$$

and the distances are evaluated in descriptor space. The "nearest misclassifying neighbor" is the nearest descriptor having a different class label. The correctly classified pattern is treated as a reinforcement pattern if r is higher than the predetermined threshold R<1. If the OCD vector derived from the input character is needed as an input pattern, then it is added at step 560. The learning procedure can be stopped by the user at step 585 if recognition has improved enough to be acceptable for the user or does not seem to be susceptible to further improvement (conditional transition YES at step 580). If the user wishes further improvement, the procedure repeats at step 520 with input of another character.

Some specific implementation details of one particular embodiment will now be discussed. A discussion of the recognition performance of this particular embodiment will follow.

In this particular embodiment, OCDs are obtained as described in reference to FIG. 5. The source polygons for characters composed of multiple pen strokes are obtained at step 415 of FIG. 5 connecting the last and first points of subsequent strokes with straight lines. The OCD set obtained for such a polygon is then labeled the 2-stroke character representative, or, if the number of strokes is greater than 2, as the multistroke character representative.

In this particular embodiment, the set of cosine coefficients is truncated at step 430 to the 7-th order. The iterative process of generating the corresponding 7th order OCD set is controlled at step 460 of FIG. 5 by simply stopping the process once it converges.

Preprocessor 220 of FIG. 2 is limited in this particular embodiment to the translation and scale normalization of the OCD set. Since only the zero-order coefficients of the OCD set are affected by translation of the corresponding pattern, the translation can be normalized by simply setting these coefficients to zero. In this particular embodiment, the zero-order coefficients have been simply removed from the OCD set, resulting in the translation-invariant 14-component OCD vector {Fk, Gk}; k=1,2, . . . ,7 (Fk and Gk are cosine coefficients denoted in accordance with (6)).

Thereafter, the scale normalization is performed by preprocessor 220 using a Euclidean metric in the OCD space {Fk, Gk}. The Euclidean (L2) norm $$\{F_k, G_k\}_{L2} = SQRT(\Sigma_k(F_k^2 + G_k^2)), k=1, \quad (5)$$

for a given OCD set is computed, and each cosine coefficient of this OCD set is divided by the norm value, resulting in a OCD vector {Fk, Gk} having unit norm. The OCD vectors so normalized can be interpreted as points located on the surface of the unit radius hypersphere in 14-dimensional space.

To assess the proximity of two characters, represented respectively by normalized OCD vectors {Fk, Gk} and {Fk, Gk}, the Euclidian distance d in the OCD space $$d = SQRT\{\Sigma_k[(F_k-F_k)^2 + (G_k-G_k)^2]\}$$

is utilized.

In this particular embodiment, decision rules generator 245 forms the initial reference library of OCD vectors from a sequence of training samples. Operations represented in FIG. 7 (except for steps 515 and 520) are utilized to form the initial reference library from a sequence of characters written by a given user. In this particular embodiment, the reference library is divided into three sections intended for OCD sets designated respectively as the single-stroke, the 2-stroke, and the multistroke character representatives. Only one of three sections is chosen to search for the nearest neighbor, as well as for the nearest misclassifying neighbor, of a given character, depending on the OCD set designation. The procedure is controlled by using 0.7 as the threshold, R. A list of 30 words including all lower-case and upper-case letters of the English alphabet, supplemented by 3 simple arithmetic expressions representing numerals and basic mathematical signs are used in the first phase of the learning procedure to form an initial reference set of 240 characters.

A final reference set of 600–800 characters of the Roman alphabet has been found to be sufficient for reliable recognition of arbitrary text written by a given user letter-by-letter. To obtain this reference library, a total of 1400–1600 training characters were entered by the user during the first and second phases of the learning procedure. Using this reference set resulted in a recognition error rate of less than 1%. The same results were obtained for handwritten characters of the Russian (Cyrillic) alphabet.

The recognition procedure of the present invention thus achieves high accuracy in multiclass shape discrimination while relying on Fourier descriptors of limited order and reference sets of limited size. The resulting benefits include acceleration of the learning procedure, reduction in the time needed to search for a nearest neighbor, and reduction of the memory needed to maintain the reference library.

Another important benefit is that compression is facilitated because the input curve can be accurately reconstructed from a relatively small OFD set. Thus, the small OFD set generated for recognition purposes can also be readily utilized for compression purposes using methods well known in the art. As a result, certain problems arising in combined recognition-compression systems, such as reduction of memory requirements for the program code and eliminating differences between the results of direct recognition and deferred recognition, may also be solved by the present invention.

While the above is a complete description of the preferred embodiments of the invention, various alternatives, modifications and equivalents could be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. In a computer-aided pattern recognition system, a method for recognizing a pattern comprising the steps of:
   digitizing said pattern to obtain a digital representation of said pattern;
   converting said digital representation of said pattern into an optimized descriptor set by repeated parametrization and transformation;
   determining in a descriptor space, using said optimized descriptor set, a decision region in which said optimized descriptor set lies, said decision region having an associated class label; and
   converting said class label to a recognition result.

2. The method of claim 1 wherein said converting step comprises the steps of:
   constructing a source polygon from said digital representation of said pattern;
   parameterizing said source polygon to obtain an initial parametric representation of said pattern;
   transforming said initial parametric representation to obtain a frequency domain representation of said pattern;
   attenuating said frequency domain representation in accordance with a predetermined order of approximation to obtain an attenuated frequency domain representation;
   inverse-transforming said attenuated frequency domain representation to obtain a parametric representation of an approximation of said source polygon;
   computing a parametrization of said approximation from said parametric representation of said source polygon;
   normalizing said parametrization of said approximation to obtain a successor parametrization of said source polygon;
   reparameterizing said source polygon in accordance with said successor parametrization to obtain a successor parametric representation of said source polygon;
   repeating said transforming, attenuating, inverse-transforming, computing, normalizing, and reparameterizing steps until said approximation meets a predetermined goodness-of-fit criterion or predetermined convergence criterion; and
   truncating a last frequency domain representation in accordance with said predetermined order of approximation, thereby obtaining a truncated last frequency domain representation as said optimized descriptor set.

3. The method of claim 2 wherein said attenuating step comprises truncating said frequency domain representation.

4. The method of claim 2 wherein said transforming step comprises obtaining a Discrete Cosine Transform of said source polygon.

5. The method of claim 2 wherein said transforming step comprises obtaining a Discrete Fourier Transform of said source polygon.

6. The method of claim 1 wherein said pattern is a character to be recognized.

7. The method of claim 1 wherein said determining step comprises the steps of:
   selecting, in said descriptor space, using said optimized descriptor set, a nearest reference descriptor set from a plurality of class-labeled reference descriptor sets stored in an electronic memory device; and
   identifying said class-label of said decision region to be a class-label associated with said nearest reference descriptor set.

8. In a computer-aided pattern recognition system, a method for constructing a library of reference descriptor sets for use in pattern recognition, said method comprising the steps of:
   capturing a digital representation of a reference pattern and a class label of the reference pattern;
   converting said digital representation of said reference pattern into an optimized reference descriptor set by repeated parametrization and transformation;
   storing said optimized reference descriptor set and said class label in a memory device as an entry in said library; and
   repeating said capturing, digitizing, compressing, and storing steps for a plurality of reference patterns and class labels.

9. The method of claim 8 further comprising the steps of:
   capturing a digital representation of a further reference pattern and a class label of said further reference pattern;
   converting said digital representation of said further reference pattern into an optimized descriptor set by repeated parametrization and transformation;
   determining, in a descriptor space, a nearest previously stored reference descriptor set to said optimized descriptor set;
   if the previously stored class label of said nearest previously stored reference descriptor set does not match said class label of said further reference pattern, storing said optimized descriptor set and said class label of said further reference pattern in said electronic memory device as an entry in said library; and
   if the previously stored class label of said nearest previously stored reference descriptor set does match said class label of said further reference pattern,
      determining, in the descriptor space, a first distance between said nearest previously stored reference descriptor set and said optimized descriptor set;
      selecting, from a set including only previously stored reference descriptor sets that do not have the same class label as the nearest previously stored reference descriptor, a non-matching previously stored reference descriptor set that is nearest to said optimized descriptor set in said descriptor space;
      determining, in said descriptor space, a second distance between said nearest reference descriptor set and said nearest non-matching reference descriptor set; and
      if a ratio of said first distance to said second distance exceeds a predetermined threshold, storing said optimized descriptor set and said class label of said further reference pattern in said electronic memory device as an added entry in said library.

10. An apparatus for pattern recognition comprising:
    a digitizer that digitizes said pattern to obtain a digital representation of said pattern;
    a converter that converts said digital representation of said pattern into an optimized descriptor set by repeated parametrization and transformation; and
    a classifier that determines, in a descriptor space, a nearest predetermined reference descriptor set to said optimized descriptor set and that converts said nearest reference descriptor set to a recognition result.

11. The apparatus of claim 10 wherein said converter comprises:
    means for constructing a source polygon from said digital representation of said pattern;

means for parameterizing said source polygon to obtain an initial parametric representation of said pattern;

means for transforming said initial parametric representation to obtain a frequency domain representation of said pattern;

means for attenuating said frequency domain representation in accordance with a predetermined order of approximation to obtain an attenuated frequency domain representation;

means for inverse-transforming said attenuated frequency domain representation to obtain a parametric representation of an approximation of said source polygon;

means for computing a parametrization of said approximation from said parametric representation of said source polygon;

means for normalizing said parametrization of said approximation to obtain a successor parametrization of said source polygon;

means for reparameterizing said source polygon in accordance with said successor parametrization to obtain a successor parametric representation of said source polygon;

means for repeatedly applying said transforming, attenuating, inverse-transforming, computing, normalizing and reparametrizing means until said approximation meets a predetermined goodness-of-fit criterion or predetermined convergence criterion; and means for truncating a last frequency domain representation of said pattern in accordance with said predetermined order of approximation, thereby obtaining a last attenuated frequency domain representation as said optimized descriptor set.

12. The apparatus of claim 11 wherein said attenuating means comprises means for truncating said frequency domain representation.

13. The apparatus of claim 11 wherein said transforming means comprises means for obtaining a Discrete Cosine Transform of said source polygon.

14. The apparatus of claim 11 wherein said transforming means comprises means for obtaining a Discrete Fourier Transform of said source polygon.

15. The apparatus of claim 10 wherein said pattern is a character to be recognized.

16. The apparatus of claim 10 wherein said classifier comprises:

means for selecting, in said descriptor space, using said optimized descriptor set, a nearest reference descriptor set from a plurality of class labeled reference descriptor sets stored in an electronic memory device; and means for identifying said class label of said decision region to be a class label associated with said nearest reference descriptor.

17. In a computer-aided pattern recognition system, apparatus for constructing a library of reference descriptor sets for use in pattern recognition, said apparatus comprising:

means for capturing a digital representation of a reference pattern and a class label of the reference pattern;

means for converting said digital representation of said reference pattern into an optimized reference descriptor set by repeated parametrization and transformation;

means for storing said reference descriptor set and said class label in a memory device as an entry in said library; and means for repeatedly applying said capturing, digitizing, converting, and storing means for a plurality of reference patterns and class labels.

18. The apparatus of claim 17 further comprising:

means for capturing a digital representation of a further reference pattern and a class label of said further reference pattern;

means for converting said digital representation of said further reference pattern into an optimized descriptor set by repeated parametrization and transformation;

means for determining, in a descriptor space, a nearest previously stored reference descriptor set to said optimized descriptor set;

means for, if the previously stored class label of said nearest previously stored reference descriptor set does not match said class label of said further reference pattern, storing said optimized descriptor set and said class label of said further reference pattern in said electronic memory device as a library entry; and means for, if the previously stored class label of said nearest previously stored reference descriptor set does match said class label of said further reference pattern, determining, in the descriptor space, a first distance between said nearest previously stored reference descriptor set and said optimized descriptor;

selecting, from a set including only previously stored reference descriptor sets that do not have the same class label as the nearest previously stored reference descriptor set, a non-matching previously stored reference descriptor set that is nearest to said optimized descriptor set said descriptor space;

determining, in said descriptor space, a second distance between said nearest reference descriptor set and said nearest non-matching reference descriptor set; and if a ratio of said first distance to said second distance exceeds a predetermined threshold, storing said optimized descriptor set and said class label of said further reference pattern in said electronic memory device as an added entry in said library.

* * * * *